Sept. 16, 1969 J. E. SANDGREN 3,467,833
DEVICE FOR IN-PHASE CONNECTION OF A LOAD TO AN ELECTRIC POLYPHASE SYSTEM
Filed March 31, 1967
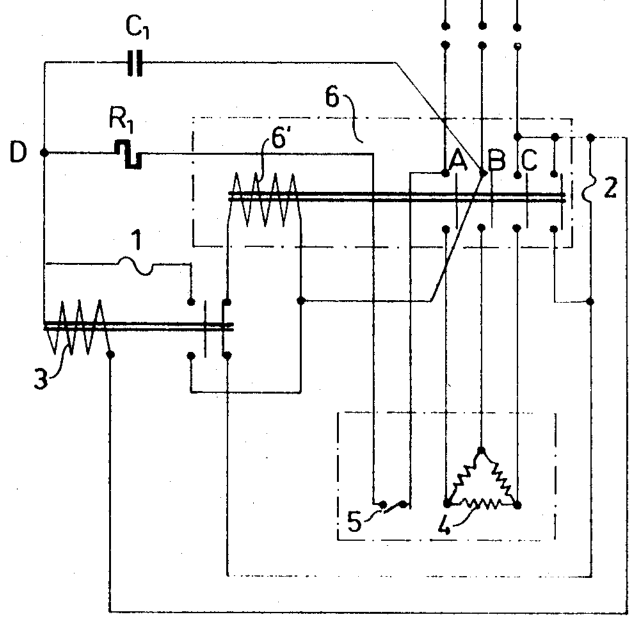
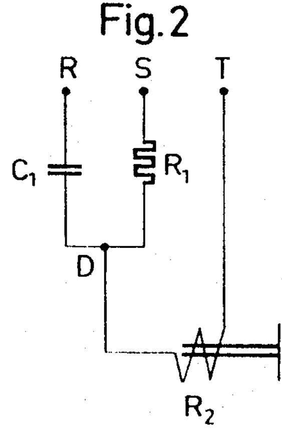
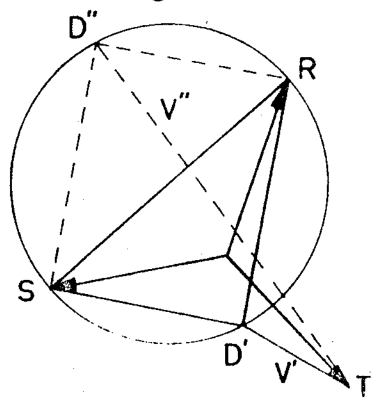

United States Patent Office 3,467,833 Patented Sept. 16, 1969

3,467,833

DEVICE FOR IN-PHASE CONNECTION OF A LOAD TO AN ELECTRIC POLYPHASE SYSTEM

Jan Erik Sandgren, Chester, Va., assignor to Stenberg-Flygt AB, Solna, Sweden

Filed Mar. 31, 1967, Ser. No. 627,358
Claims priority, application Sweden, Apr. 7, 1966, 4,866/66
Int. Cl. H02h *1/04, 3/26;* H01h *7/16*
U.S. Cl. 307—93 4 Claims

ABSTRACT OF THE DISCLOSURE

A device for in-phase connection including a phase-sequence-sensing circuit and a relay controlling a contactor is provided for the connection of a load to an electric polyphase system. The phase-sequence-sensing circuit is provided with a thermistor connectable in parallel with one or more components of said circuit and arranged to minimize the effect exerted on the relay by interference currents occurring at the instant of connection.

BACKGROUND OF THE INVENTION

Field of the Invention.—The invention relates to a device for in-phase connection of a load to an electric polyphase system by means of a phase-sequence-sensing apparatus controlling a connecting organ which apparatus comprises an active connecting component.

Description of the prior art.—When connecting a load to a polyphase system, for instance when the load consists of a rotating electric machine, it is essential that the connection is performed in such a way that the phase-sequence in the load machine is correct, that is to say that it corresponds to the phase-sequence of the system. It is therefore desirable that the phase-sequence be indicated before the load is connected to the system so that the connections may be switched in case of incorrect phase-sequence. The stresses to which an electric machine is subjected when started with incorrect phase-sequence can thus be avoided.

It is known that when a reactance is connected in series with a resistance between two phases of a polyphase system, the amplitude of the voltage between a third phase and a point located between the reactance and the resistance will depend upon the phase-sequence across the two first-named phases. By connecting, for instance, a suitable size relay to the voltage which depends upon the phase-sequence, it is possible to have the relay actuate an electric circuit. This electric circuit may be, for instance an auxiliary circuit comprising a coil controlling for a contactor connecting a load to the system in such a way that the auxiliary circuit remains closed when the phase-sequence of the load corresponds to that of the system but is broken when the phase-sequence of the load does not correspond to that of the system.

It has, however, not been possible to use a phase-sequence-indicating apparatus comprising an active connecting component such as a relay to the extent which would have been expected from the wide field of potential application, because the device is not stable at the instant when the connection to the line voltages occurs. The reason for the lack of stability is because reactances cause interference currents when they are connected to a voltage source. If the phase-sensing circuit includes a capacitance connected in series with a resistance, a current surge occurs at the instant when the connection is made, which surge, as can be mathematically established, constitutes an exponentially decreasing current superimposed on the line current.

At the instant of connection, the current and voltage conditions are further influenced by several other factors which are very difficult to analyze, and the interference voltages which arise are primarily to be considered as stochastic variables. Practical tests with phase-sequence-sensing apparatus comprising a relay show that the relay, when intended to remain inactive, operates at the instant when the device is connected to an electric system, while the relay, when intended to operate, only operates during a very short instant and thereafter drops out again to an inactive position and then operates once more. This implies that the load connected to the system is subjected to severe stresses since violent current surges may occur at the starting instant.

In order to avoid the relay, when arranged to operate for a determined phase-sequence, dropping out again due to interference voltages, the relay coil is generally connected to a further circuit intended to feed the relay with a holding current. The device is then arranged in such a way that the holding circuit is closed when the relay operates. This means, however, that the relay, when it should remain inactive, but has been operated accidentally by interference (noise) voltages, cannot drop out again.

SUMMARY OF THE INVENTION

The present invention has for its object to overcome all the above difficulties and consists mainly of a device for in-phase connection of a load to an electric polyphase system by means of a connecting member (a contactor, for instance) controlled by means of a phase-sequence-sensing apparatus consisting of a phase-sensitive circuit (an RC-coupling network, for instance) and an active connecting component (a relay, for instance), the invention being mainly characterized in that a thermistor is provided in the phase-sensing apparatus, said thermistor being connectable in parallel with one or more of the components of the phase-sensitive circuit and arranged to minimize the effects on the active connecting caused by the interference voltages which occur when connection is made. According to a further development of the invention the thermistor is connected to the holding circuit of the relay and thus prevents the holding current from immediately rising to its full value. Therefore the relay, in case of undesirable operation (as by a spike of noise), immediately drops out because the holding current does not reach its full intensity fast enough.

Contrarily, in the case where the relay is intended to operate in response to the determined phase-sequence, the intensity of the current fed to the relay from the phase-sensing circuit plus a progressively increasing holding current via the holding circuit which is closed when the relay operates, is sufficient to maintain the relay in operation even if interference voltages occur. The fact that in this case the holding current only progressively reaches its full value does not cause the relay to drop out, since the voltage and consequently the intensity of the current fed to the relay coil from the phase-sensing circuit are much higher for the phase-sequence for which the relay is intended to operate than for the phase-sequence for which the relay is intended to remain inactive.

According to an advantageous further development of the invention, a thermistor is also inserted into the circuit controlled by the relay of the phase-sensing apparatus. Thus the current intensity at the instant of connection does not immediately reach its full value in the controlled auxiliary circuit comprising the load connecting contactor, for instance. The contactor therefore does not operate immediately which allows sensing of the phase-sequence before the load is connected to the system. In case of incorrect phase-sequence which is to cause the relay to operate, only the auxiliary current fed to the contactor needs to be cut off and not the main current fed to the loading. The loading machine thus is not subjected to the stresses caused by a trial start with incorrect phase-sequence.

The device according to the invention also makes possible efficient supervision of possible overheating of the load machine. By inserting a thermal overload breaker in the branch of the phase-sensing circuit which comprises the resistance, the relay can be caused to operate and thus cut the auxiliary current fed to the contactor in case the load machine gets overheated. If the time constant of the thermistor inserted into the holding circuit of the relay is suitably chosen with regard to the time constant of the thermal overload breaker, one obtains a sufficient holding current through the relay before the thermal overload breaker again recloses. Thus, if a fault has occurred in the load machine, which has caused an overheating of the machine, the load is disconnected from the system and not connected again independently of the position of the thermal overload breaker.

BRIEF DESCRIPTION OF THE DRAWING

FIG. 1 is a wiring diagram according to the invention and comprising a load, a phase-sequence-sensing apparatus, and thermistors for eliminating the effect of voltage and current peaks on said apparatus, FIG. 2 is a basic circuit diagram of a phase-sequence-sensing apparatus, and FIG. 3 is a circular diagram of phasors associated with the phase-sequence-sensing apparatus.

DESCRIPTION OF THE PREFERRED EMBODIMENT

FIG. 1 shows a capacitance $C_1$ connected in series with a resistance $R_1$ between the points A and B of a contactor for a three-phase load machine 4. A thermal overload breaker 5 is inserted into the series circuit. A relay 3 is connected between points C and D. The capacitance $C_1$, the resistance $R_1$ and the relay 3 constitute the phase-sequence-sensing apparatus. The relay is fed with a voltage depending of the phase-sequence across points A and B. FIG. 2 is a detail view of the wiring. The potential at point D depends of the voltage superimposed on the phase conductors R and S and is different depending upon whether the phase-sequence is RST or SRT. The voltage between the point D and the third phase conductor T thus depends upon the phase-sequence across the phase conductors R and S.

In FIG. 3 a circular phaser diagram shows the potential at point D for two different phase-sequences. The phase voltages of the three-phase system are represented by R, S and T. For the phase-sequence RST the point D is at a potential which approximately corresponds to the point D′ on the circular diagram, the voltage between the point D and the third phase conductor T being illustrated on the circular diagram by the vector V′. If however the phase-sequence is SRT, the potential at point D corresponds approximately to point D″ on the circular diagram, the voltage between point D and the third phase conductor T being illustrated by the vector V″. The voltage across the coil $R_2$ of the relay 3 will thus be considerably higher for the phase-sequence SRT, hereinafter called the incorrect phase-sequence, than for the phase-sequence RST, hereinafter called the correct phase-sequence. By dimensioning the relay 3 so that its operating voltage is higher than V′ but lower than V″, it is possible to have the relay control an auxiliary circuit in dependence of the phase-sequence.

According to the present invention the relay is intended to control the auxiliary current fed to a contactor 6 associated with a load machine 4. In the off-position of the relay 3 the control coil 6′ of the contactor is connected to a closed auxiliary circuit, said circuit being broken when the relay operates. The relay is thus proportioned so that the operation, and consequently the breaking of the auxiliary current to the contactor, occur in case of incorrect phase-sequence. A holding current is connected between points B and D in order to avoid the relay, after operation, dropping out again due to an interference voltage superimposed on and of opposite polarity to the voltage V″. The contactor control coil 6′ is connected between points B and C, thus being connected to the phase voltage when the device is connected to an RST three-phase system. As mentioned above, interference voltages and currents occur at the connection instant, the effect of said voltages and currents on the relay being eliminated by the thermistor 1 included in the holding circuit. Should the relay operate due to a transient current surge just when connection is made even if the phase-sequence is correct, the contactor control coil 6′ will not be fed any auxiliary current if a holding current is fed to the relay 3. Due to the thermistor 1, the holding current intensity does not immediately reach its full value and the relay will therefore immediately drop out and the auxiliary circuit of the contactor 6 remains closed so that the contactor may connect the load 4 to the system.

Due to the thermistor 2 included in the auxiliary circuit of the contactor 6, the auxiliary current fed to the contactor will not immediately reach its full intensity at the instant of connection to the system so that the contactor making contact will be slightly delayed. There is therefore time enough for the phase-sequence-sensing apparatus to sense the phase-sequence, and the voltage V′ or V″ across the relay 3 reaches its full value. Thus, in case of incorrect phase-sequence, the auxiliary current fed to the contactor control coil 6′ is interrupted before the contactor has had time to make contact and the load 4 will not be subjected to any trial start in case of incorrect phase-sequence.

From FIG. 1 it can also be seen that a thermal overload breaker 5 has been connected between the resistance $R_1$ and the point A. In case of a possible overheating of the load machine, the resistance $R_1$ will thus be disconnected from the point A. The potential at point D will thus change, and if the electric components in the phase-sequence-sensing apparatus have been suitably chosen, the voltage across the relay 3 will be sufficient for the relay to operate. A holding current is progressively building up across the thermistor 1, and if the time constant of the thermistor is lower than the restoring time constant of the thermal overload breaker 5, the relay 3 remains in on-position and the auxiliary circuit to the contactor control coil 6′ is broken. The load 4 will thus not be connected again to the system. By means of a suitable signalling device, not shown on the drawing, a fault alarm can be given so that the fault can be eliminated.

Although the invention has been described in connection with embodiments shown in the drawing, it is obvious that many alterations or modifications may be made within the scope of the appending claims.

I claim:

1. In a device for in-phase connection of a load to an electric polyphase system comprising:

(a) input terminal means adapted to receive polyphase power from a power source, (b) output terminal means adapted to supply polyphase power to a polyphase load, (c) polyphase connector means for interconnecting the input terminal means with the output terminal means in a definite phase sequence, (e) a phase sequence sensing means comprising an RC circuit having two ends and an intermediate point, the two ends being connected respectively to two of said input terminals, the RC circuit comprising a resistive element and a capacitive element in series, and (f) an active connector control means connected between said intermediate point and a third one of said input terminals for controlling the operation of the polyphase connector means in response to the phase of the polyphase power, The improvement comprising:

(g) a thermistor connected in the RC circuit and arranged to be switched into parallel connection with at least one of the elements in the RC circuit, whereby the effect on the active connector control means caused by interference currents occurring when the connection is made is minimized.

2. A device according to claim 1 in which the active connector control means is a holding circuit for the polyphase connector means, and wherein the switching of the thermistor is done by the holding circuit.

3. A device according to claim 2 wherein the active connector control means comprises a relay and the polyphase connector means comprises a contactor and wherein the relay is provided with a break contact to control the operation of the contactor and a make contact to control the switching of the thermistor into parallel connection.

4. A device according to claim 3 wherein the operation of the contactor is controlled by an auxiliary circuit, said auxiliary circuit including a second thermistor connected in the path of the auxiliary circuit operating current, whereby the buildup of said current is delayed when connection is made.

References Cited

UNITED STATES PATENTS

| | | | |
|---|---|---|---|
| 2,914,703 | 11/1959 | Clark | 307—127 X |
| 3,215,865 | 11/1965 | Grimme | 307—127 X |
| 3,218,485 | 11/1965 | Takai | 307—127 |
| 3,364,363 | 1/1968 | Iordanidis | 307—127 |

ROBERT K. SCHAEFER, Primary Examiner

T. B. JOIKE, Assistant Examiner

U.S. Cl. X.R.

307—127; 317—48, 49